US006119053A

United States Patent [19]

Taylor et al.

[11] Patent Number: 6,119,053

[45] Date of Patent: Sep. 12, 2000

[54] VENDING MACHINE DUAL BUS ARCHITECTURE

[75] Inventors: Kit W. Taylor, Stone Mountain, Ga.; Walter Sacilowski, Tokyo, Japan; Noel Lanier, Loganville, Ga.

[73] Assignee: The Coca-Cola Company, Atlanta, Ga.

[21] Appl. No.: 09/049,204

[22] Filed: Mar. 27, 1998

[51] Int. Cl.[7] .................................................... G06F 17/00

[52] U.S. Cl. .................... 700/231; 700/230; 364/479.01; 370/364

[58] Field of Search .................................... 370/364, 419, 370/351; 700/231

[56] References Cited

U.S. PATENT DOCUMENTS

| | | | |
|---|---|---|---|
| 4,025,760 | 5/1977 | Trenkamp | 235/61.7 B |
| 4,107,777 | 8/1978 | Pearson et al. | 364/465 |
| 4,803,348 | 2/1989 | Lohrey et al. | 235/381 |
| 5,617,547 | 4/1997 | Feeney et al. | 370/419 |
| 5,713,028 | 1/1998 | Takahashi et al. | 395/750 |
| 5,959,869 | 9/1999 | Miller et al. | 364/479.01 |

FOREIGN PATENT DOCUMENTS

| | | |
|---|---|---|
| 40 26 533 | 2/1992 | Germany . |
| 2 255 260 | 10/1992 | United Kingdom . |

OTHER PUBLICATIONS

A. Trumik, Controller and System for Vending Machine, Patent Abstracts of Japan (vol. 099, No. 003) of JP 10 340270A, Dec. 22, 1998.

*Primary Examiner*—Michael Horabik
*Assistant Examiner*—Prenell Jones
*Attorney, Agent, or Firm*—Finnegan, Henderson, Farabow, Garret & Dunner, L.L.P.

[57] ABSTRACT

A vending machine operating system architecture connects vending machine peripherals of different communication standards to a main vending machine controller. One way to connect the two disparate buses is to use a UART device for each. An even more cost effective approach is to use a communications coprocessor (which is at least equivalent to a UART device) to which each of the two disparate buses is selectively connected by a multiplexer under the control of the main vending machine controller.

13 Claims, 3 Drawing Sheets

205

LOOK-UP TABLE

| | DEVICE | BUS | ADDRESS ON BUS |
|---|---|---|---|
| 308 | PERIPHERAL 216 | FIRST BUS 214 | ADDRESS 1 |
| 310 | PERIPHERAL 218 | FIRST BUS 214 | ADDRESS 2 |
| 312 | PERIPHERAL 222 | SECOND BUS 220 | ADDRESS 1 |
| 314 | PERIPHERAL 224 | SECOND BUS 220 | ADDRESS 2 |
| | 302 | 304 | 306 |

*FIG. 3*

VENDING MACHINE DUAL BUS ARCHITECTURE

FIELD OF THE INVENTION

The invention is directed toward a vending machine operating system architecture, and more particularly to a vending machine operating system architecture for operatively connecting vending machine peripherals of different communication standards to a main controller.

BACKGROUND OF THE INVENTION

Vending machines have not been standardized throughout the world. Rather, vending machines are as varied as the cultures of the countries in which the machines are located. For example, vending machines in Japan are very different than vending machines in the United States.

The Japanese culture is accustomed to buying a great many goods from a great variety of relatively sophisticated vending machines. The United States, in contrast, has a culture which is accustomed to purchasing a much smaller variety of goods from generally less sophisticated vending machines. The Japanese market tends to produce more sophisticated and more expensive hardware/architecture from which its vending machines are constructed. In contrast, the hardware of U.S. vending machines tends to be less sophisticated and less expensive.

At a basic level, vending machines throughout the world share similar attributes. For example, they all include a controller that controls the operation of numerous peripheral devices. These peripherals are connected to the controller via a communications bus. In the United States, the standard vending machine communications bus is the MDB standard, i.e., the "International Multi-drop Interface Standard," established by the National Automatic Merchandising Association (NAMA) of Chicago, Ill. As expected, this is not the vending machine communication standard in Japan. There, the standard appears to be the VCCS standard.

A universal characteristic of the market for machine-vended goods is that these markets are extremely sensitive to the hardware costs of the vending machine. A small difference in cost of the hardware for a given machine can greatly effect its profitability.

To use a Japanese bill and coin validation mechanism, for example, a U.S. machine requires the Japanese mechanism to be modified so that it can communicate using the MDB protocol rather than the VCCS protocol. Alternatively, a specialized adapter could be constructed to convert from the VCCS protocol to the MDB protocol so that the Japanese mechanism could be used without modification. Both of these techniques significantly raise the cost of using the Japanese mechanism or peripheral.

Another option for using a Japanese peripheral device in a U.S. machine would be to provide the U.S. machine with a controller having two serial ports. One of the ports would be dedicated to the MDB bus, while the other would be dedicated to the VCCS bus. Unfortunately, this requires a custom integrated circuit (IC) that has two serial ports. Such a customized IC is very expensive.

It is a problem to integrate vending machine peripheral devices of disparate communication standards, e.g., MDB and VCCS, into a single vending machine and yet still have acceptably low hardware costs given the extreme price sensitivity of the market for machine-vended goods.

SUMMARY OF THE INVENTION

It is an object of the invention to solve the problems of the conventional art discussed above.

It is an object of the invention to provide a vending machine architecture for operatively connecting vending machine peripherals of different communication standards to a main controller in a cost effective manner given the extreme cost sensitivity in the market for machine-vended goods.

The objects of the invention are fulfilled by providing a vending machine operating system architecture for operatively connecting vending machine peripherals of different communication standards to a main controller, the architecture comprising: a main controller; a first bus for connecting to at least one vending machine peripheral according to a first communication standard; a second bus for connecting to at least one vending machine peripheral according to a second communication standard; and connection means for connecting at least one of said first bus and second bus to said main controller.

The connection means of the present invention can be embodied by two universally synchronous receiver/transmitter (UART) devices for the first and second buses, respectively. Alternatively and preferably, the connection means can be embodied by a multiplexer for selectively connecting the main controller to either the first bus or the second bus.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3 depicts the look-up table of the second embodiment in more detail.

DETAILED DESCRIPTION OF THE PRESENT EMBODIMENTS

Figure 1:
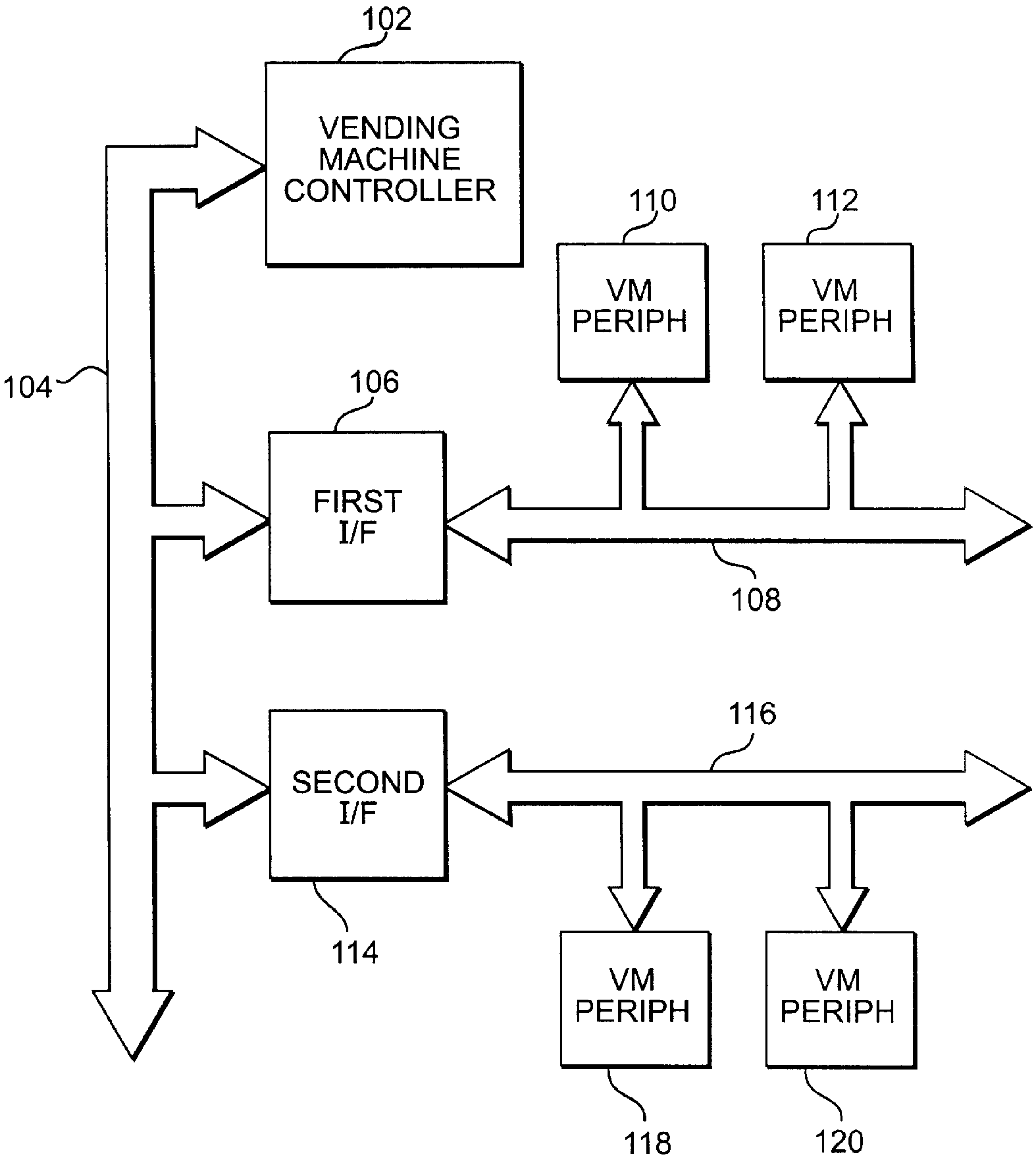
FIG. 1 is a block diagram of the first embodiment of the invention.

FIG. 1 is block diagram of the first embodiment of the present invention.

In FIG. 1, a vending machine controller 102 is connected to a main, preferably parallel, bus 104. A first interface 106 is connected between the main bus 104 and a first bus 108. The first bus 108 supports communication according to a first communication standard. Peripheral vending machine devices 110 and 112 are connected to the first bus 108 and communicate via the first communication standard. Examples of the peripherals 110 and 112 include coin mechanisms, credit card readers and bill validators. The peripherals 110 and 112, and the first bus 108, preferably conform to a serial standard, and more preferably conform to the MDB communication standard.

Also in FIG. 1, a second interface 114 connects the main bus 104 to a second bus 116. The second bus 116 supports communications according to a second communication protocol different than the protocol for the first bus 108. Vending machine peripheral devices 118 and 120 are connected to the second bus 116. Examples of the peripherals 118 and 120 include coin mechanisms, credit card readers and bill validators.

The communications standard supported by the second bus 116 and to which the peripherals 118 and 120 conform is preferably a serial standard, and is more preferably the VCCS standard of Japan. Alternatively, the protocol supported by the second bus 116 and the peripherals 118 and 120 could be any other well known serial standard such as RS-232, RS-485 or IRDA (for infrared data transfer).

It is noted that only two (2) peripheral devices have been depicted for each of the buses 108 and 116 to reduce the complexity of the drawing. These are merely representative of the many peripherals that can be attached to such buses.

The interfaces 106 and 114 of FIG. 1 are preferably a universal asynchronous receiver/transmitter (UART) device. Alternatively, the interfaces 106 and 114 could be formed from an array of discreet logic components.

The general VCCS electrical specification is: serial, eight data bits, seven wires (two data, sync, signal common, power ground 24 v, 8 v); 4800 bits per second, 0–24 volts signal. The electrical specification for the MDB protocol is: serial current loop; five wires (two data, signal common, power ground, 34 v) nine bits (eight data bits plus 'status right single' bit), 9600 bits per second, 0–5 volts signal (TTL level).

Both the MDB and VCCS standards use device addresses from 0 to 31. The VCCS protocol augments the eight data bits with a separate directional (controller to peripheral) synchronization signal line. In contrast, the MDB protocol uses eight data bits plus a bi-directional 'status right single' bit.

Figure 2:
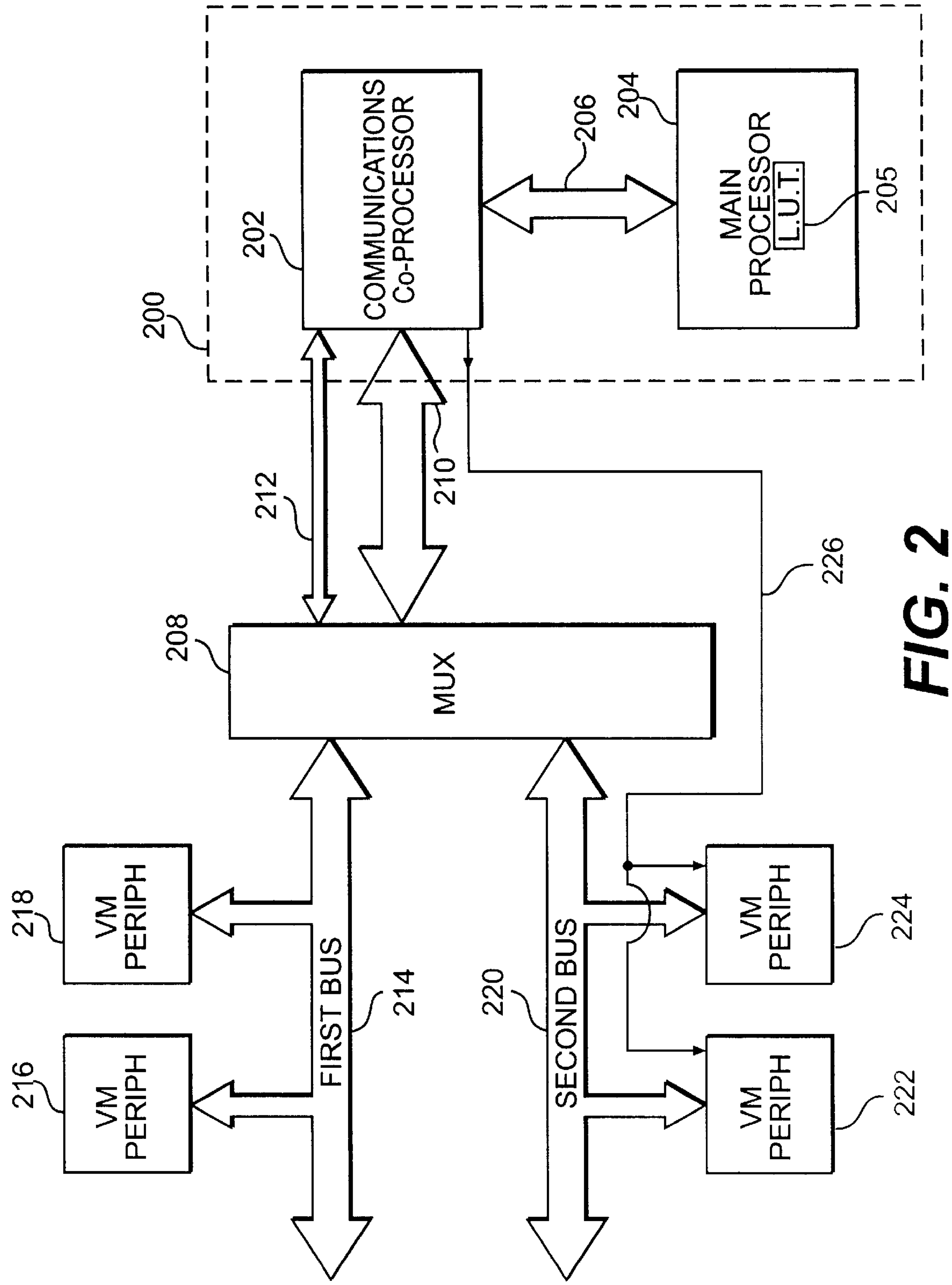
FIG. 2 is a block diagram of a second embodiment of the invention.

FIG. 2 depicts a block diagram of a second embodiment of the invention.

In FIG. 2, a main controller 200 includes a main processor 204 and a main communications co-processor 202 connected to the main processor 204 via a preferably parallel bus 206. The communications co-processor 202 has at least the functional capabilities of a UART device. The main processor 204 includes a look-up table 205. The main controller 200, more specifically the communications co-processor 202, is connected to a multiplexer 208 via a bus 210. In addition, the communications co-processor 202 sends one or more control signals to the multiplexer 208 via the bus 212.

The multiplexer 208 of FIG. 2 is connected to a first bus 214 and a second bus 220. The first bus 214 supports a communication protocol different than the second bus 220. Vending machine peripheral devices 216 and 218 are connected to the first bus 214 and conform to the communication protocol of the first bus 214. Similarly, vending machine peripheral devices 222 and 224 connect to the second bus 220 and conform to the communication protocol thereof. As with the first embodiment, only two peripheral devices have been depicted as being connected to the buses to simplify the drawings; these are two of but many peripherals that can be connected to the first and second buses, respectively. An additional signal line 226 is shown as conveying a signal from the communications co-processor 202 to each of the peripherals 222 and 224.

The protocol of the first bus is preferably serial and more preferably is the MDB standard. The protocol of the second bus is preferably serial, and is more preferably the VCCS standard of Japan. Alternatively, the protocol of the second bus could be any other well known serial standard such as RS-232, RS-485 or IRDA (for infrared data transfer).

Because the first bus 214 and the second bus 220 are both serial, the bus 210 is necessarily serial. To account for the differences between the MDB standard and the VCCS standard, the additional signal line 226 is provided over which the communications co-processor sends a synchronization signal.

FIG. 3 depicts the look-up table 205 of FIG. 2 in more detail. Column 302 of table 205 lists the identity of a device that is connected to either the first bus 214 or the second bus 220. The second column 304 identifies the bus to which the device identified in the same row at column 302 is connected. The third column 306 lists the address of the device identified in the same row at column 302. Thus, the rows 308, 310, 312 and 314 present the pertinent information for the peripheral devices 216, 218, 222 and 224, respectively.

The operation of the embodiments of the invention will be described below.

Both of the preferred bus communication protocols, namely the MDB standard and the VCCS standard, use a half-duplex polling scheme rather than an interrupt-driven scheme. The main controller 102 of FIG. 1 or the primary processor 204 of FIG. 2 sequentially polls the various peripherals on the first and second buses 108 and 116, respectively. The peripherals remain silent on the bus until they are polled, at which time they perform an action an/or respond with status information.

Among the components of a vending machine, the UART devices in the interfaces 106 and 114 are comparable, and second only, in cost to the processor embodying the main controller 102. While more cost effective than, e.g., re-engineering a VCCS-based peripheral to operate directly according to the MDB protocol or providing a custom designed converter for converting from the VCCS protocol to MDB protocol, the embodiment of FIG. 1 is more expensive than the embodiment of FIG. 2. Hence the embodiment of FIG. 2 is preferred.

In FIG. 2, one interface in the form of the communications co-processor 202 (having at least the functional capabilities of a single UART), is needed rather than two UART devices. But to achieve this approximately 50% reduction in the number of UART devices required, the multiplexer 208 must be provided. When the main processor 204 desires to poll a peripheral on a given bus, it sends one or more control signals to the multiplexer 208 via the communications co-processor 202 that causes the multiplexer to connect the bus 210 to the selected first or second bus 214 or 220.

The main processor 204 uses the information within the look-up table 205 to locate a desired peripheral device. For example, if the main processor 204 needs to access the peripheral 216, then it retrieves the identity of the bus to which the peripheral 216 is connected and the address that the peripheral 216 has on that bus by applying the identity of the peripheral 216 to the table 205.

An advantage of the invention is that it permits peripheral devices conforming to disparate communication protocols to be used within the same vending machine in a cost effective manner despite the extreme cost sensitivity of the market for machine-vended goods. Moreover, the second embodiment only requires the use of a single communications co-processor rather than two UART devices, which represents an approximately 50% cost savings for what is the second most expensive component in a vending machine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A vending machine operating system architecture for operatively connecting vending machine peripherals of different communication standards to a main controller, the architecture comprising:

a main controller;

a first bus operatively connected to at least one vending machine peripheral and supporting communications according to a first vending machine communication standard;

a second bus operatively connected to at least one other vending machine peripheral and supporting communications according to a second vending machine communication standard; and connection means for operatively connecting said first bus and said second bus to said main controller.

2. The architecture of claim 1, wherein said connection means includes a multiplexer for selectively connecting said main controller to one of said first bus and said second bus.

3. The architecture of claim 1, wherein said first communication standard and said second communication standard are serial.

4. The architecture of claim 3, wherein said first communication standard is the multi-drop bus (MDB) standard.

5. The architecture of claim 3, wherein at least one additional signal line is connected between each of the vending machine peripherals coupled to said second bus and said main controller.

6. The architecture of claim 3, wherein said second communication standard is the VCCS standard.

7. The architecture of claim 1, wherein said main controller includes:

a communications co-processor connected to said connection means; and a primary processor connected to said communications co-processor.

8. The architecture of claim 7, wherein said main processor includes a look-up table for storing data relating an identity of each of said vending machine peripherals, the buses to which said peripherals connect, and the address assigned to said peripherals, respectively.

9. The architecture of claim 1, wherein said main controller includes a main bus connected to said main controller, and said connection means includes a first interface for interfacing said first bus to said main bus, and a second interface for interfacing said second bus to said main bus.

10. The architecture of claim 9, wherein said first interface includes a first universal asynchronous receiver/transmitter (UART) device and said second interface includes a second UART device.

11. A vending machine operating system architecture for operatively connecting vending machine peripherals of different communication standards to a main controller, the architecture comprising:

a main controller;

a first bus operatively connected to a first vending machine peripheral and supporting communications according to a first communication standard;

a second bus operatively connected to a second vending machine peripheral and supporting communications according to a second communication standard; and connection means for operatively connecting said first bus and said second bus to said main controller.

12. The architecture of claim 11, wherein the first bus is operatively connected to at least one additional vending machine peripheral.

13. The architecture of claim 12, wherein the second bus is operatively connected to at least one additional vending machine peripheral different from the peripherals connected to the first bus.

* * * * *

UNITED STATES PATENT AND TRADEMARK OFFICE

CERTIFICATE OF CORRECTION

PATENT NO.: 6,119,053

DATED: September 12, 2000

INVENTORS: Kit W. TAYLOR et al.

It is certified that an error appears in the above-identified patent and that said Letters Patent is hereby corrected as shown below:

On the Title Page, in the "Attorney, Agent, or Firm," L. 2, "Garret" should read --Garrett--

Signed and Sealed this

Twenty-fourth Day of April, 2001

Attest:

Nicholas P. Godici

NICHOLAS P. GODICI

*Attesting Officer*

*Acting Director of the United States Patent and Trademark Office*